United States Patent
Abe et al.

(10) Patent No.: US 7,353,900 B2
(45) Date of Patent: Apr. 8, 2008

(54) BATTERY COOLING SYSTEM

(75) Inventors: Takaaki Abe, Yokohama (JP); Masaaki Suzuki, Kanagawa (JP); Hideaki Horie, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 207 days.

(21) Appl. No.: 11/216,069

(22) Filed: Sep. 1, 2005

(65) Prior Publication Data

US 2006/0060402 A1     Mar. 23, 2006

(30) Foreign Application Priority Data

Sep. 21, 2004    (JP)   ............................. 2004-274016
Sep. 21, 2004    (JP)   ............................. 2004-274017

(51) Int. Cl.
    *B60R 16/04*      (2006.01)

(52) U.S. Cl. ..................... 180/68.5; 180/65.3

(58) Field of Classification Search .............. 180/68.5, 180/65.1, 65.2, 65.3, 65.4; 903/907, 952
See application file for complete search history.

(56) References Cited

U.S. PATENT DOCUMENTS

| | | | | |
|---|---|---|---|---|
| 5,390,754 A | * | 2/1995 | Masuyama et al. | ........ 180/68.5 |
| 5,392,873 A | * | 2/1995 | Masuyama et al. | ........ 180/68.5 |
| 5,490,572 A | * | 2/1996 | Tajiri et al. | ................. 180/65.1 |
| 5,585,205 A | * | 12/1996 | Kohchi | ........................ 429/99 |
| 5,730,237 A | * | 3/1998 | Matsuki et al. | ............. 180/65.1 |
| 6,094,927 A | * | 8/2000 | Anazawa et al. | .............. 62/239 |
| 6,188,574 B1 | * | 2/2001 | Anazawa | ..................... 361/695 |
| 6,315,069 B1 | * | 11/2001 | Suba et al. | ................. 180/68.5 |
| 6,541,154 B2 | * | 4/2003 | Oogami et al. | ............. 429/159 |
| 6,978,855 B2 | * | 12/2005 | Kubota et al. | ............. 180/65.3 |
| 7,051,825 B2 | * | 5/2006 | Masui et al. | ................ 180/68.5 |
| 2002/0102457 A1 | * | 8/2002 | Oogami et al. | ............. 429/159 |

* cited by examiner

*Primary Examiner*—Jeff Restifo
(74) *Attorney, Agent, or Firm*—Foley & Lardner LLP

(57) ABSTRACT

A battery cooling system includes a depression-shaped battery accommodating section formed at a bottom surface of a floor panel of a vehicle and dented to side of a passenger compartment so as to accommodate therein a battery. An introduction device is disposed in front of the battery in a vehicle traveling direction, to introduce travel air flow into the battery accommodating section. Here, the battery is accommodated within the battery accommodating section in a condition where a bottom surface of the battery is located at a level above or at a substantially same level as a level of a bottom surface of the vehicle which bottom surface is around the accommodating section. Additionally, the battery includes a plurality of thin cells which are electrically connected with each other, and disposed in a posture that a major surface of each thin cell extends substantially parallelly with the vehicle traveling direction.

8 Claims, 15 Drawing Sheets

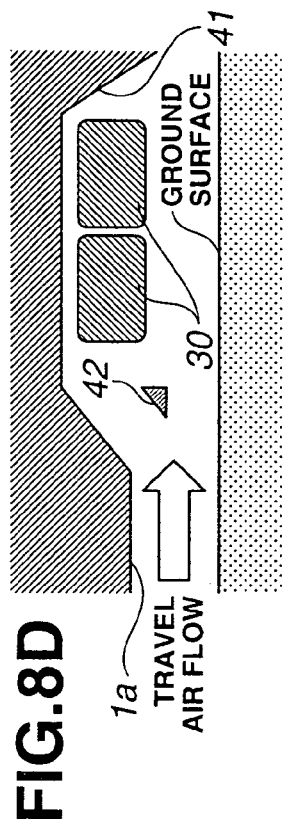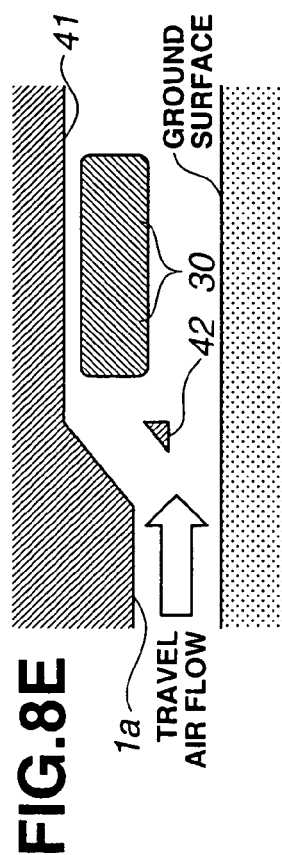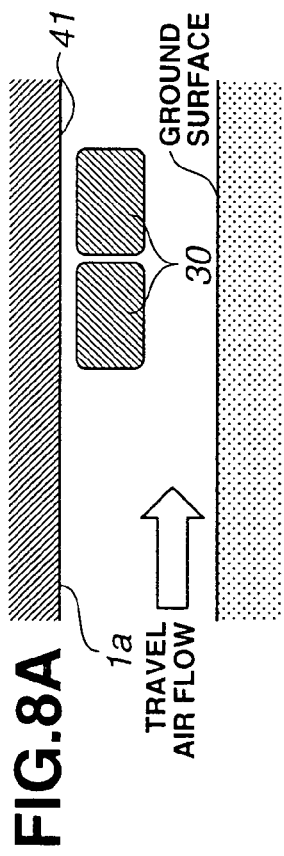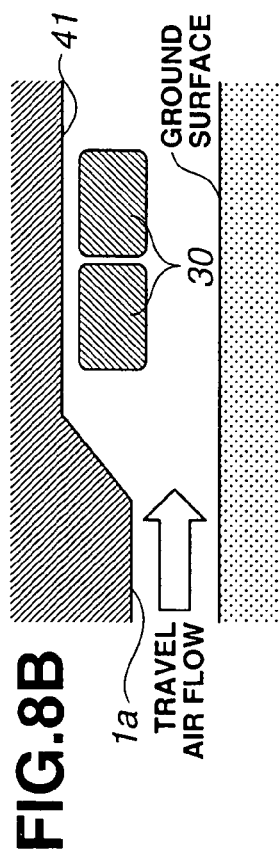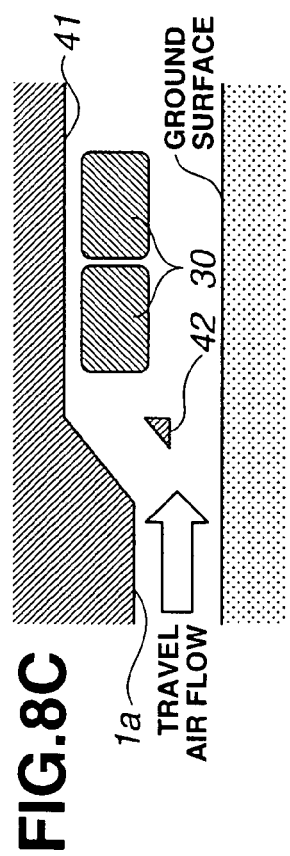

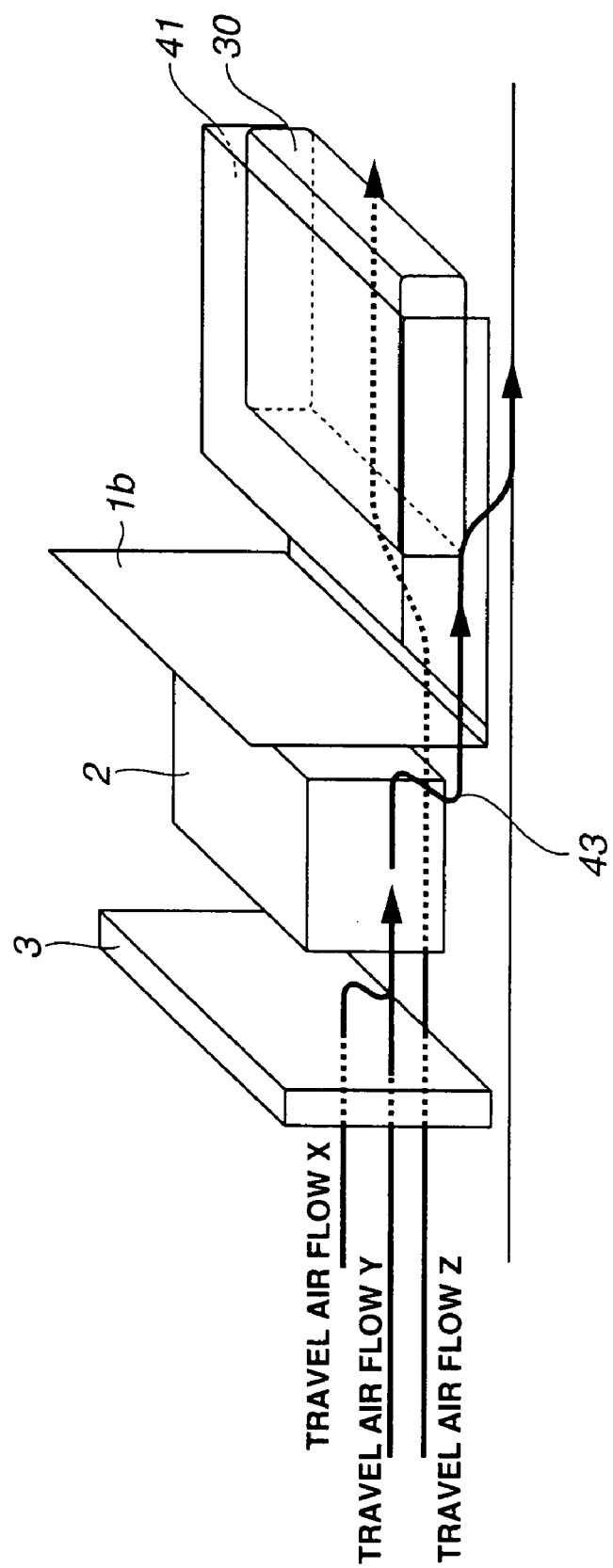

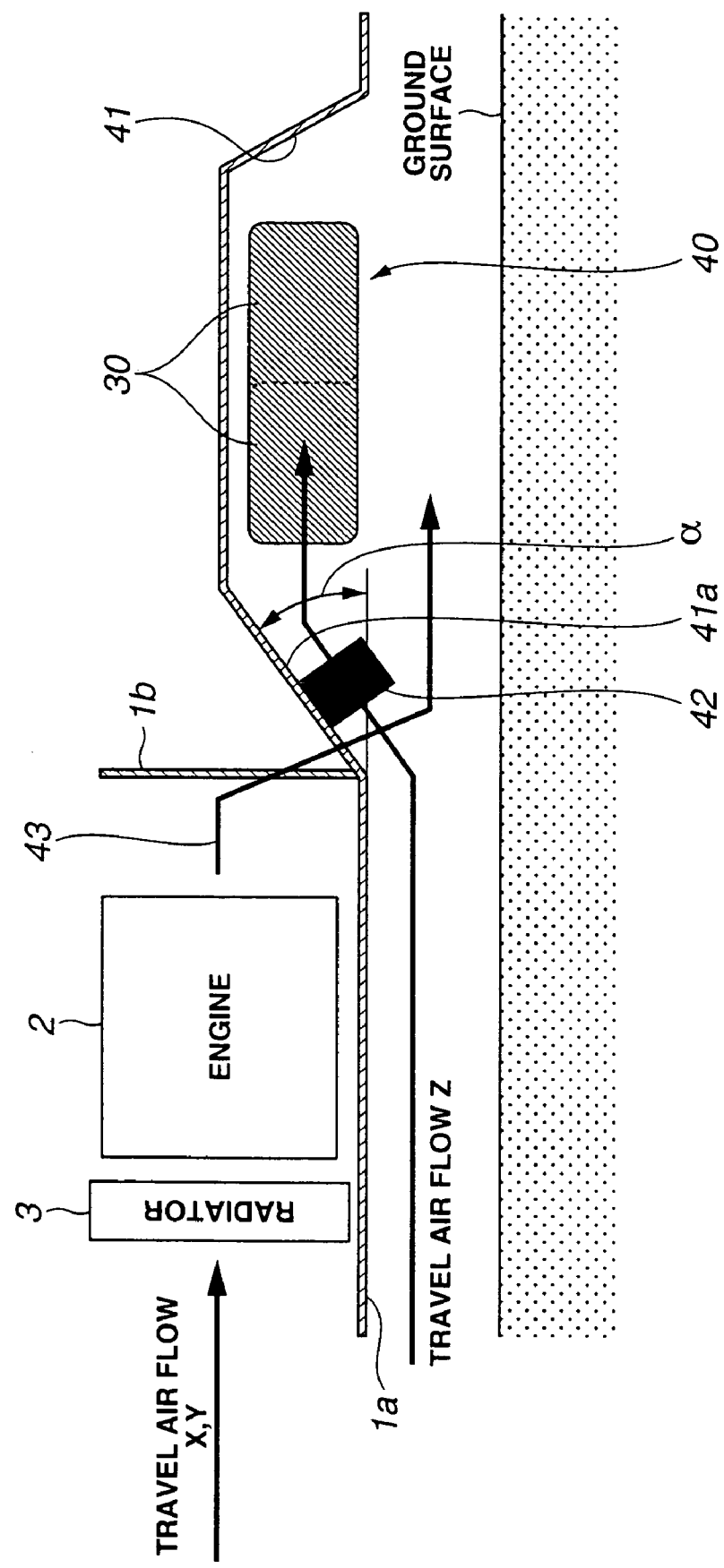

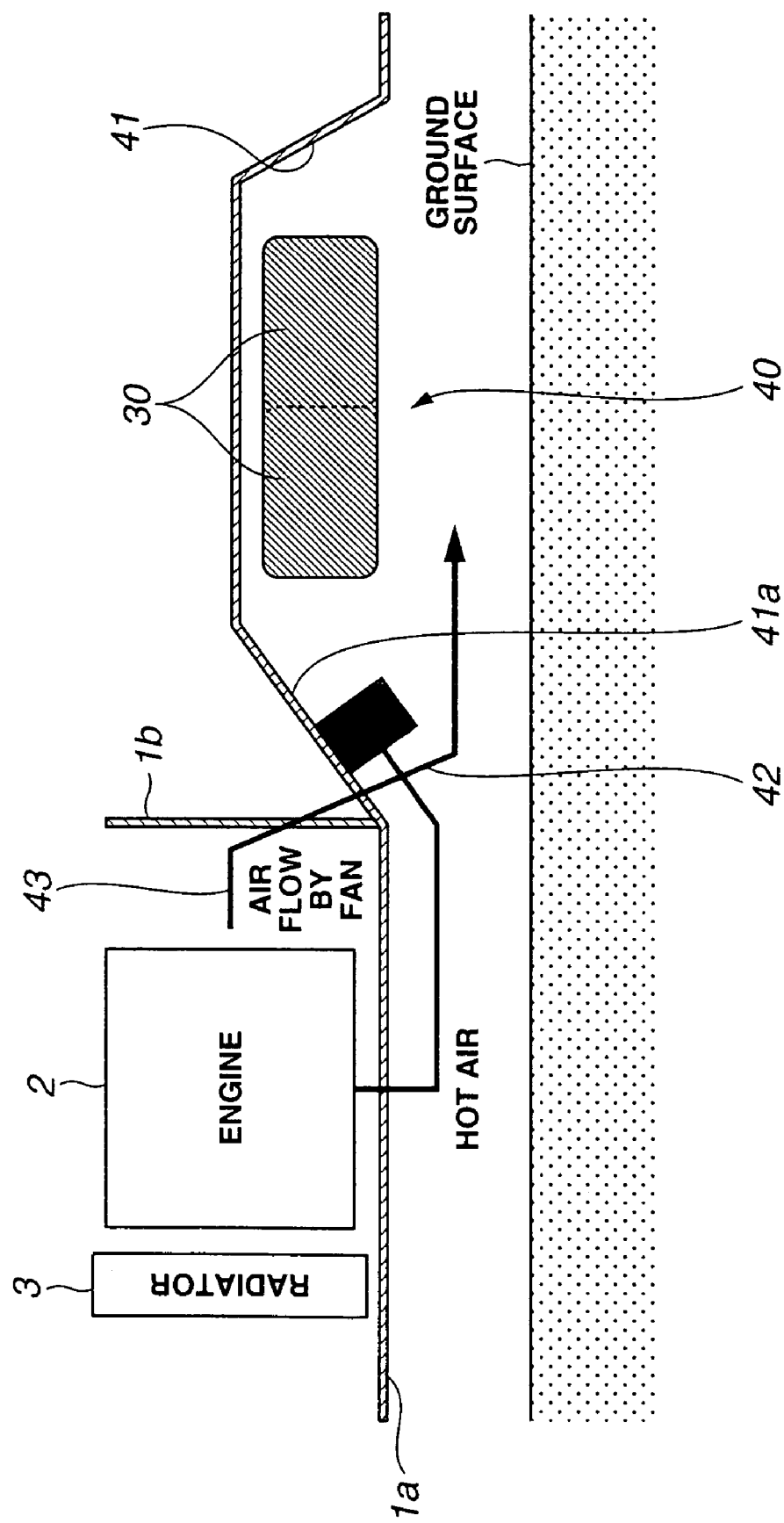

TIME AFTER STOPPING OF
VEHICLE TUNNING (min.)

BATTERY COOLING SYSTEM

BACKGROUND OF THE INVENTION

This invention relates to improvements in a battery cooling system in which a battery is cooled by using travel air flow generated with traveling of a vehicle.

In order to cool a battery mounted as a driving power source on, for example, an electric vehicle (EV), a hybrid electric vehicle (HEV), a fuel cell powered vehicle (FCV) and the like, it has been proposed to use travel air flow as a cooling medium, generated with traveling of the vehicle.

BRIEF SUMMARY OF THE INVENTION

However, with the above proposition, there arises problems that travel air flow cannot be effectively struck against the battery under restriction conditions such as the size of the battery, the mounting position of the battery, or the like, thereby making it impossible to sufficiently suppress a temperature rise of the battery.

It is, therefore, an object of the present invention to provide an improved battery cooling system which can effectively overcome drawbacks encountered in conventional battery cooling systems of the similar nature.

Another object of the present invention is to provide an improved battery cooling system which can effectively cool a battery by using travel air flow generated with traveling of a vehicle.

A further object of the present invention is to provide an improved battery cooling system which can effectively suppress a temperature rise of a battery during stopping of traveling of the vehicle.

According to the present invention, a battery cooling system comprises a battery. A depression-shaped battery accommodating section is formed at a bottom surface of a floor panel of a vehicle and dented to side of a passenger compartment so as to accommodate therein the battery. An introduction device is disposed in front of the battery in a vehicle traveling direction, to introduce travel air flow into the battery accommodating section. Here, the battery is accommodated within the battery accommodating section in a condition where a bottom surface of the battery is located at a level above or at a substantially same level as a level of a bottom surface of the vehicle which bottom surface is around the accommodating section. Additionally, the battery includes a plurality of thin cells which are electrically connected with each other, and disposed in a posture that a major surface of each thin cell extends substantially parallelly with the vehicle traveling direction.

BRIEF DESCRIPTION OF THE DRAWINGS

In the drawings, like reference numerals designate like parts and elements throughout all figures in which:

FIG. 8A is a schematic sectional view of a battery cooling system outside the scope of the present invention;

FIGS. 8A to 8E are schematic sectional views of the battery cooling systems according to the present invention;

FIG. 10A is a schematic perspective view of the embodiment of the battery cooling system of FIG. 9, showing a condition established during traveling of the vehicle;

FIG. 10B is a schematic sectional view of the battery cooling system of FIG. 9, showing the condition established during traveling of the vehicle;

FIG. 11 is a schematic perspective view of the battery cooling system of FIG. 9, showing a condition established during stopping of traveling of the vehicle;

DETAILED DESCRIPTION OF THE INVENTION

Figure 1:
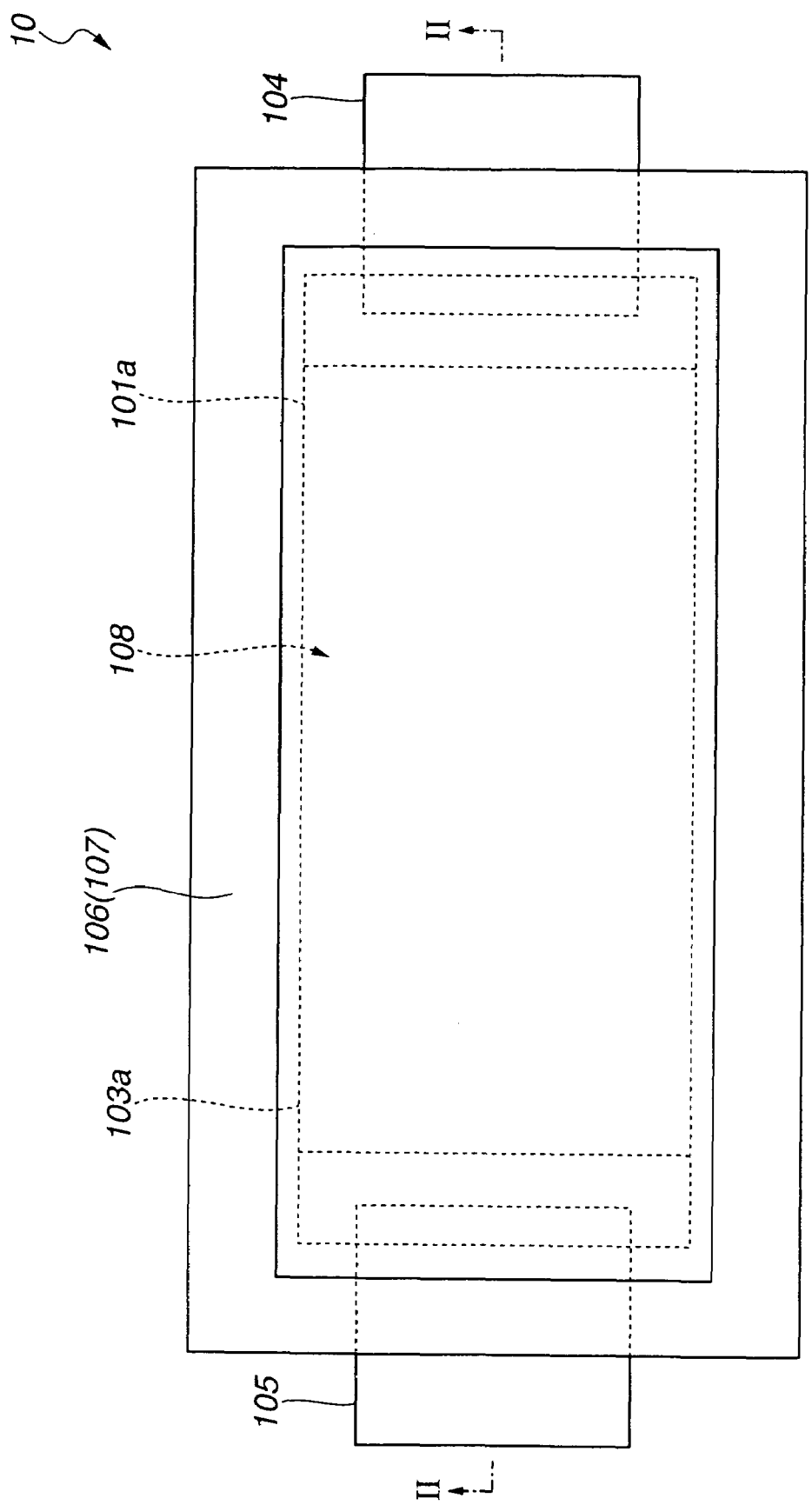
FIG. 1 is a plan view of the whole body of a thin cell forming part of a battery used in an embodiment of a battery cooling system according to the present invention.
Figure 2:
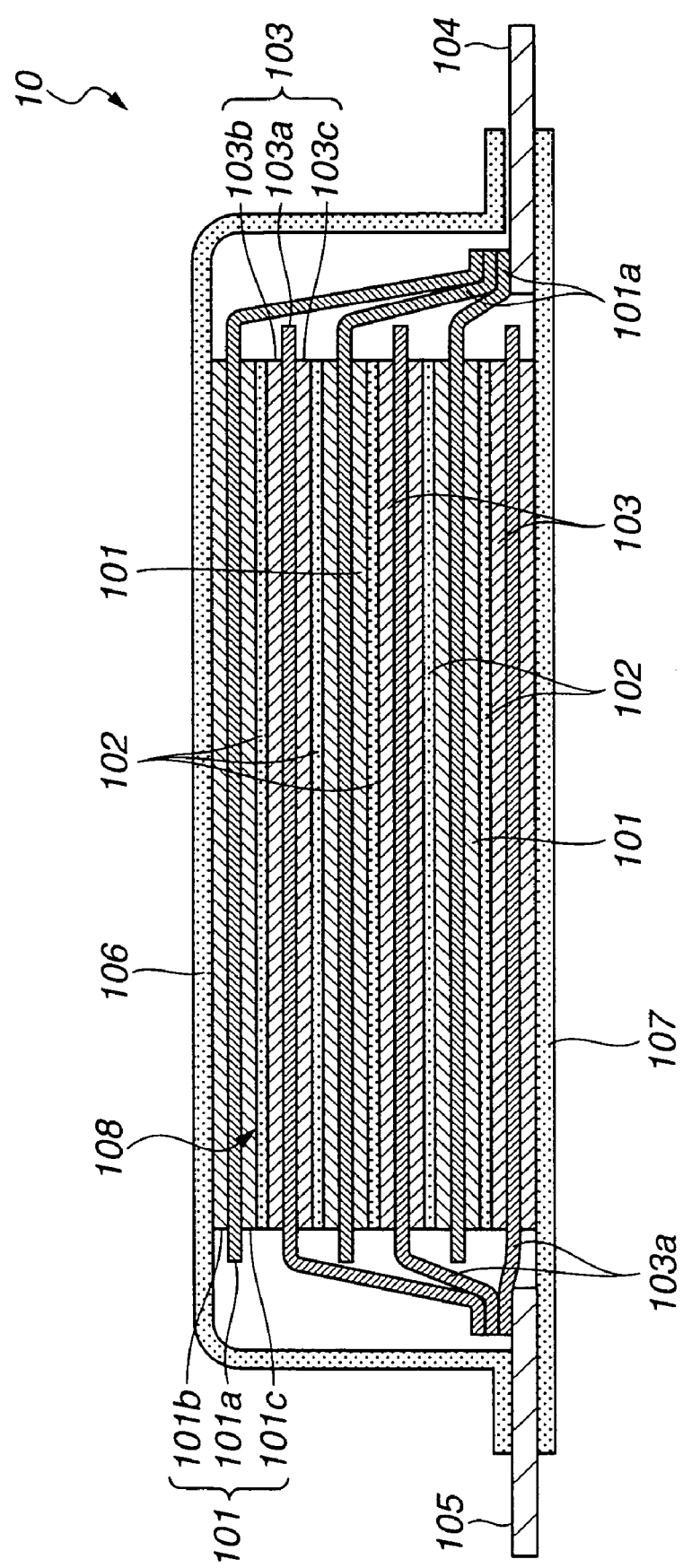
FIG. 2 is a sectional view taken in the direction of arrows substantially along the line II-II of FIG. 1.

Referring now to FIGS. 1 to 8E of the drawings, an embodiment of battery cooling system 40 according to the present invention is illustrated. The battery cooling system comprises a battery 30 which is constituted of a plurality of thin cell (or laminate cell) 10 each of which serves as a unit cell. Accordingly, these thin cells 10 are laminated to constitute the battery having a desired voltage and capacity as shown in FIGS. 1 and 2. FIG. 1 is a plan view of the whole body of the thin cell forming part of the battery used in the embodiment of the battery cooling system; and FIG. 2 is a sectional view taken in the direction of arrows substantially along the line II-II of FIG. 1.

As illustrated in FIGS. 1 and 2, each thin cell 10 of battery 30 of the present invention is a lithium ion secondary (rechargeable) cell which is able to be laminated or piled up on another similar lithium ion secondary cell. Each thin cell 10 includes three anode plates 101 and three cathode plates 103. Each anode plate 101 and each cathode plate 103 are alternately disposed to each other. Five separators 102 are provided in such a manner that each separator 102 is interposed between adjacent anode plate 101 and cathode plate 103. Anode terminal 104 is connected to anode plates 101, while cathode terminal 105 is connected to cathode plates 103. Upper outer covering member 106 and lower outer covering member 107 sealingly cover the anode plates 101 and cathode plates 103. Electrolyte (not shown) is filled between upper and lower covering members 106, 107. Thin cell 10 has a total thickness of, for example, not larger than 10 mm. Anode plates 101, separators 102, cathode plates 103 and the electrolyte constitute a so-called power generating element 108.

Each anode plate 101 forming part of power generating element 108 includes anode side collector 101a which extends and is connected to anode terminal 104. Anode plate 101 includes anode layers 101b, 101c which are respectively formed on the opposite major surfaces of anode side collector 101a. Anode side collector 101a of this anode plate 101 is formed of an electrochemically stable metal foil such as aluminum foil, aluminum alloy foil, copper foil, nickel foil or the like.

Anode layers 101b, 101c of anode plate 101 is formed by mixing an anode active material, for example, a lithium-nickel compound (double) oxide such as $LiNiO_2$ or the like, lithium-manganese compound (double) oxide such as $LiMn_2O_4$ or the like, lithium-cobalt compound (double) oxide such $LiCo_2$ or the like, or chalcogenide containing S, Se and/or Te with a conductive agent such as carbon black or the like, a binder such as an aqueous dispersion of polyethylene fluoride or the like thereby forming a mixture, and then by applying the mixture on the opposite major surfaces of the anode side collector 101a, followed by drying and compressing the applied mixture.

Each cathode plate 103 forming part of power generating element 108 includes cathode side collector 103a which extends and is connected to cathode terminal 105. Cathode plate 103 includes cathode layers 103b, 103c which are respectively formed on the opposite major surfaces of cathode side collector 103a. Cathode side collector 103a of this cathode plate 103 is formed of an electrochemically stable metal foil such as nickel foil, copper foil, stainless steel foil, iron foil or the like.

Cathode layers 103b, 103c of cathode plate 103 is formed as follows: First, an aqueous dispersion of resin powder of styrene-butadiene rubber as a precursor of an organic sintered body is mixed with a cathode active material which can storage and release lithium ions of the above anode active material, such as an amorphous carbon, non-graphitizable carbon, graphitizable carbon or graphite thereby to form a mixture. Then, the mixture is dried and pulverized thereby forming a main material in which carbonized styrene-butadiene rubber is carried on the surface of carbon particle. The main material is mixed with a binder such as an acrylic resin emulsion thereby to form a main material mixture. This main material mixture is coated on the opposite major surfaces of cathode side collector 103a, followed by drying and compressing the coated main material mixture.

Particularly in case that the amorphous carbon and/or non-graphitizable carbon are used, the resultant battery is poor in flat characteristics of voltage during charging and discharging, so that output voltage is lowered in accordance with a discharge amount. Accordingly, the resultant battery is not suitable for a power source for communication equipments and office equipments but is advantageous for an electric source for an electric vehicle because the battery has no abrupt power drop.

Each separator 102 functions to prevent a short circuit between the above-mentioned anode plate 101 and cathode plate 103, and may be provided with a function to maintain the electrolyte. This separator 102 is, for example, a microporous film formed of polyolefin or the like such as polyethylene (PE), polypropylene (PE) or the like. This separator 102 has also a function to block pores of its layer under the influence of heat generation during flow of overcurrent. Separator 102 of this embodiment is formed not only of a single layer of polyolefin or the like, so that the separator may be formed of a three-layer structure in which a polypropylene film is interposed between polyethylene films, or formed of a laminated layer which is formed by laminating a polyolefin microporous film(s), an organic non-woven fabric and the like. By thus making separator 102 multi-layered, the resultant battery can be provided with various functions such as an overcurrent preventing function, an electrolyte maintaining function, a shape-maintaining (rigidity improving) function and the like.

In the above power generating element 108, anode plate 101 and cathode plate 103 are alternately laminated to each other in which separator 102 is interposed between the anode and cathode plates. Three anode plates 101 are connected to anode terminal 104 formed of a metal foil, through respective anode side collectors 101a. Similarly, three cathode plates 103 are connected to cathode terminal 105 formed of a metal foil, through respective cathode side collectors 103a.

The numbers of anode plates 101, separators 102 and cathode plates 13 in the above power generating element 108 are not limited to those in the above embodiment, so that power generating element 108 may be constituted of one anode plate 101, three separators 102 and one cathode plate 103. Thus, the numbers of the anode plates, the separators and the cathode plates may be selected to constitute the power generating element.

The materials of anode terminal 104 and cathode terminal 105 are not particularly limited as far as they are electrochemically stable metal materials, in which the material of anode terminal 104 is, for example, aluminum foil, aluminum alloy foil, copper foil, nickel foil or the like similarly to the above-mentioned anode side collector 101a, and the material of cathode terminal 105 is, for example, nickel foil, copper foil, stainless foil, iron foil or the like.

Power generating element 108 is sealingly accommodated between upper outer covering member 106 and lower outer covering member 107. Though not shown, each of upper outer covering member 106 and lower outer covering member 107 is constituted of a resin-metal thin film laminate material having a three-layer structure. The resin-metal thin film laminate material includes an inner layer formed of a resin (plastic) film excellent in electrolytic solution resistance and thermal weldability, such as polyethylene, polypropylene or the like, an intermediate layer formed of a metal foil such as aluminum foil or the like, and an outer layer formed of a resin film excellent in electric insulation, such as polyamide-based resin, polyester-based resin or the like, located in a direction of from the inner side to the outer side of the thin cell 10.

With these upper and lower outer covering members 106, 107, the above-mentioned power generating element 108 and a part of each of anode electrode 104 and cathode electrode 105 are sealingly wrapped or covered so as to form a space defined by the upper and lower outer covering members. Sealing between upper and lower outer covering members 106, 107 is made by accomplishing a thermal press along the outer peripheral edges of the upper and lower covering members which peripheral edges are contacted with each other, upon pouring a liquid electrolyte into the space defined by upper and lower outer covering members 106, 107 while sucking air in the space to put the space into a vacuum condition. The above liquid electrolyte is prepared by dissolving a solute such as lithium perchlorate ($LiClO_4$), lithium borofluoride ($LiBF_4$), lithium phosphate hexafluoride ($LiPF_6$) and/or the like in an organic liquid solvent. Examples of the above organic liquid solvent are ester solvents such as propylene carbonate (PC), ethylene carbonate (EC), dimethyl carbonate (DMC), methylethyl carbonate (MEC) and/or the like; however, the organic liquid solvent in the present invention is not limited to the above listed solvents so that organic liquid solvents prepared by mixing γ-butyrolactone (γ-BL), diethoxyethane (DEE) and/or the like in an ester solvent may be used as the organic liquid solvent.

Figure 3:
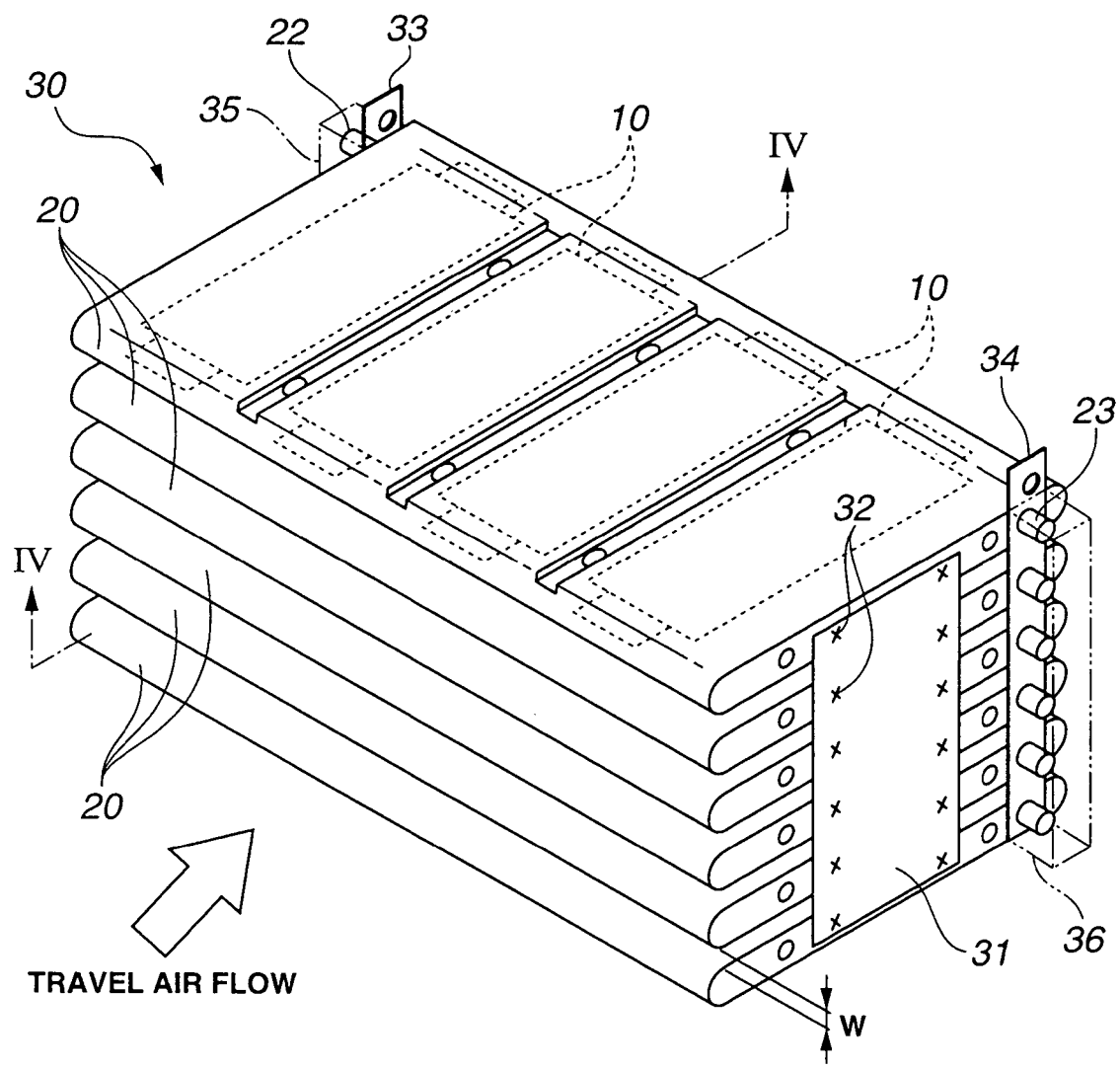
FIG. 3 is a perspective view of the battery used in the embodiment of the battery cooling system.

The battery 30 using the above arranged thin cell 10 will be discussed hereinafter with reference to FIGS. 3 and 4. FIG. 3 is a perspective view of the battery used in the embodiment of the battery cooling system, and FIG. 4 is a vertical sectional view taken in the direction of arrows substantially along the line IV-IV of FIG. 3.

Figure 4:
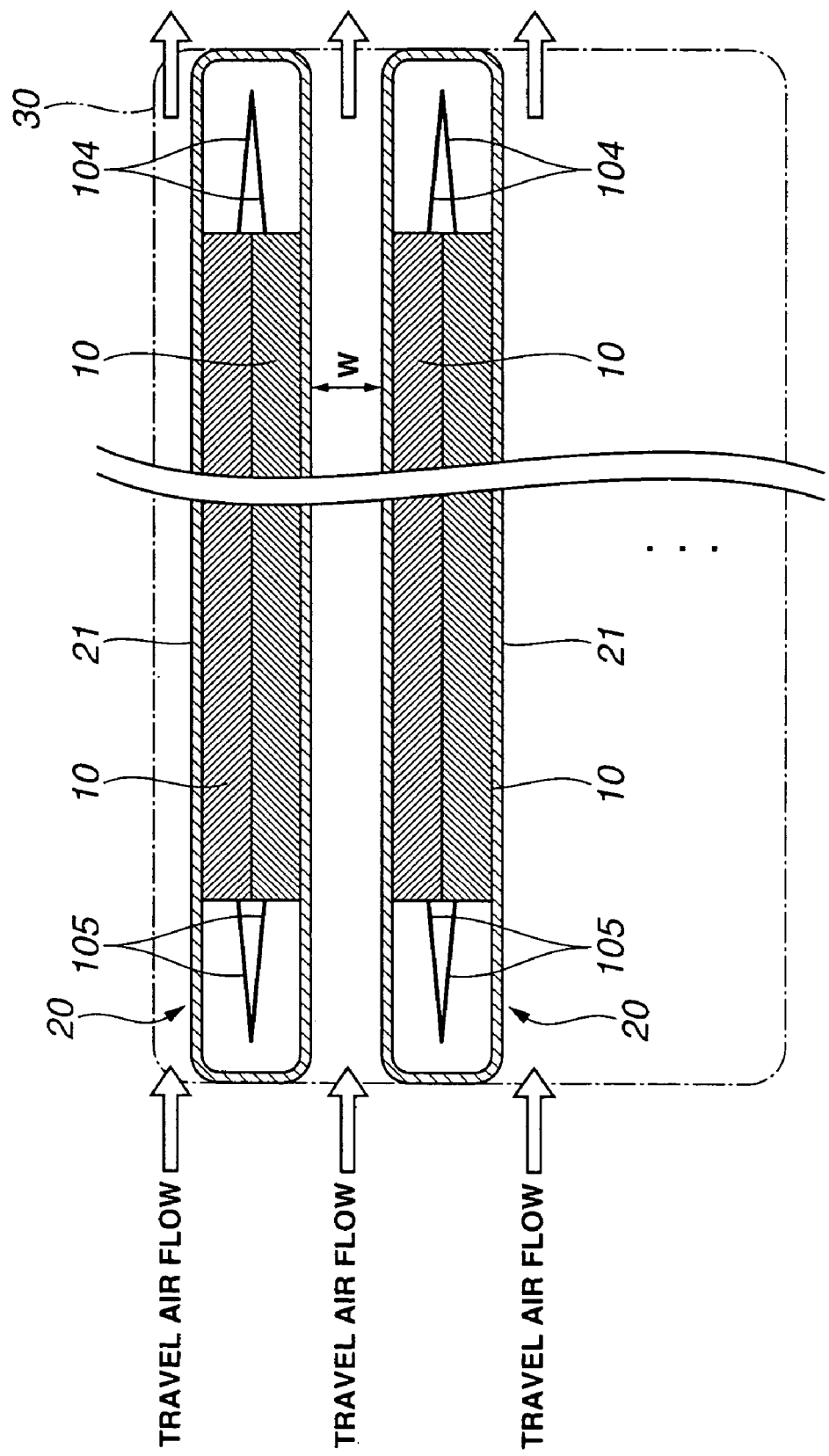
FIG. 4 is a vertical sectional view taken in the direction of arrows substantially along the line IV-IV of FIG. 3.

As illustrated in FIGS. 3 and 4, battery 30 according to this embodiment of the present invention is constituted by piling up six sub-assemblies 20 while electrically connecting sub-assemblies 20 to each other by electrode terminals 33, 34 for outside connection. It will be understood that only two sub-assemblies 20 are clearly shown in the cross-sectional view of FIG. 4 though the six sub-assemblies 20 exist.

Sub-assemblies 20 constituting battery 30 will be discussed. Each sub-assembly 20 includes eight thin cells 10 mentioned above as shown in FIGS. 3 and 4 and constructed as follows: Two thin cells 10 are combined in such a manner that their backside major surfaces are in contact with each other, thereby forming a combination. Four of the combinations are arranged side by side, so that thin cells 10 are arranged in two stages and two rows. These eight thin cells 10 are electrically connected in parallel with each other, for example, by directly welding electrode terminals 104, 105 to each other.

The eight thin cells thus arranged in two stages and four rows are accommodated inside sub-assembly cover 21 thereby forming sub-assembly 20. As shown in FIG. 3, anode terminal 22 for the sub-assembly and cathode terminal 23 for the sub-assembly are drawn out through the respective opposite end sections of sub-assembly cover 21. Anode terminals 104 of the eight thin cells 10 constituting sub-assembly 20 are electrically connected to sub-assembly anode terminal 22. Similarly, cathode terminals 105 of the eight thin cells 10 constituting sub-assembly 20 are electrically connected to sub-assembly cathode terminal 23.

In this embodiment, six sub-assemblies 20 each of which is arranged above are piled up in such a manner that terminals 22 or terminals 23 are directed or extend to the same direction as shown in FIG. 3. In other words, sub-assembly 20 located at the m+1 stage is piled up on sub-assembly 20 located at the m stage in such a manner that terminals 22 or terminals 23 of sub-assembly 20 located at the m-stage and sub-assembly 20 located at the m+1 stage are directed or extend to the same direction (where, m is a natural number).

The thus piled up six sub-assemblies 20 are connected with each other by flat plate-like connecting members 31 which are fixed to the opposite side surface sections of the sub-assemblies 20. Each connecting member 31 is formed with a plurality of through-holes through which screws 32 for fixing are fastened to each sub-assembly 20, so that each sub-assembly 20 is fixed to the connecting member 31. The through-holes formed in the connecting member 31 are arranged at the interval (or pitch) of a distance larger than thickness of each sub-assembly 20, so that a clearance or distance W of, for example, about 3 mm is formed between the adjacent sub-assemblies 20, 20 connected with each by the connecting member 31 as shown in FIG. 3.

All anode terminals 22 (of assemblies 20) directed to the same direction are electrically connected to electrode terminal 33 for the outside connection, while all cathode terminals 23 (of assemblies 20) directed to the same direction are electrically connected to electrode terminals 34 for the outside connection. Thus, battery 30 is assembled so as to be able to be electrically connected to the outside through electrode terminals 33, 34.

Each of the electrode terminals 33, 34 for the outside connection is flat plate-shaped and rectangular in plan, in which a plurality of holes for insertion of the terminals are formed in each terminal 33, 34 by machining so as to have such a diameter that each electrode terminal 22, 23 for the sub-assembly can be inserted or press-fitted to the hole. These terminal insertion holes are formed at the intervals (or pitch) of a distance substantially equal to that of the through-holes formed in the connecting member 31. Additionally, an insulating cover 35, 36 formed of a material high in electrical insulation is disposed to each electrode terminal 33, 34 for the outside connection. With this insulating cover 35, 36, all electrode terminals 22, 23 for the sub-assemblies are covered thereby preventing the battery 30 from being exposed to the outside. It will be seen that insulating covers 35, 36 are shown in phantom in FIG. 3.

Figure 5:
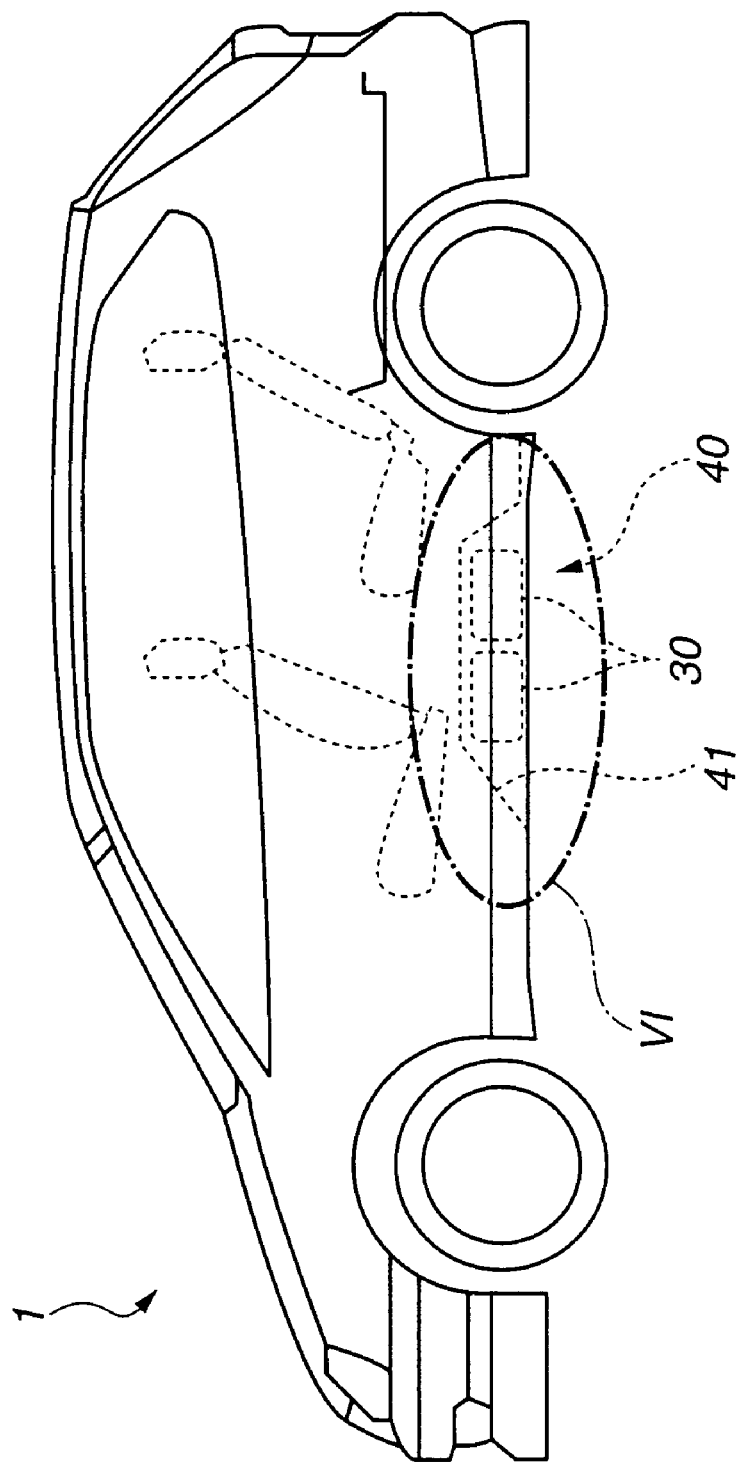
FIG. 5 is a schematic side view of a vehicle on which the embodiment of the battery cooling system is mounted.
Figure 6:
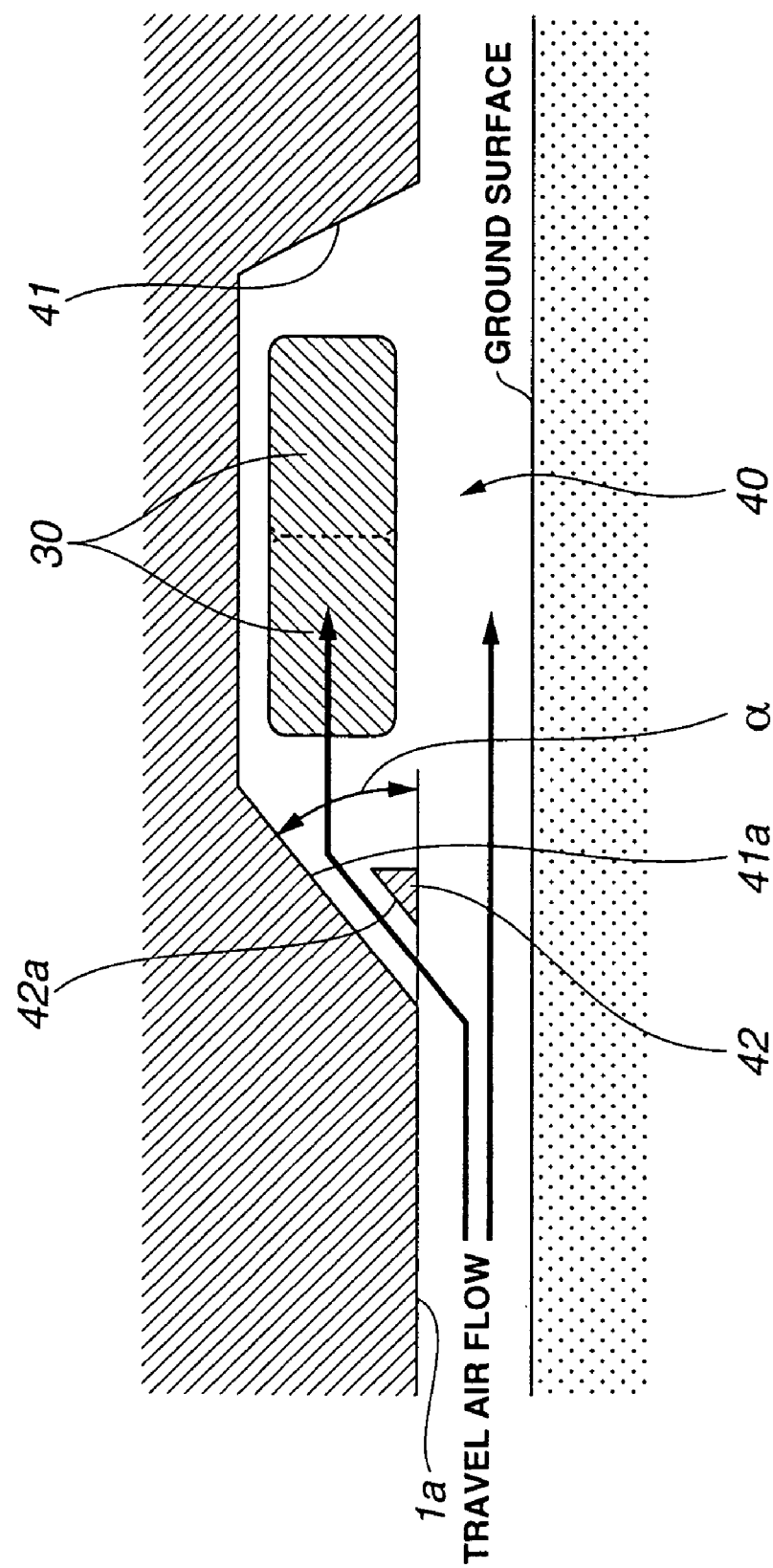
FIG. 6 is an enlarged view of a part VI in FIG. 5, showing the embodiment of the battery cooling system according to the present invention.
Figure 7:
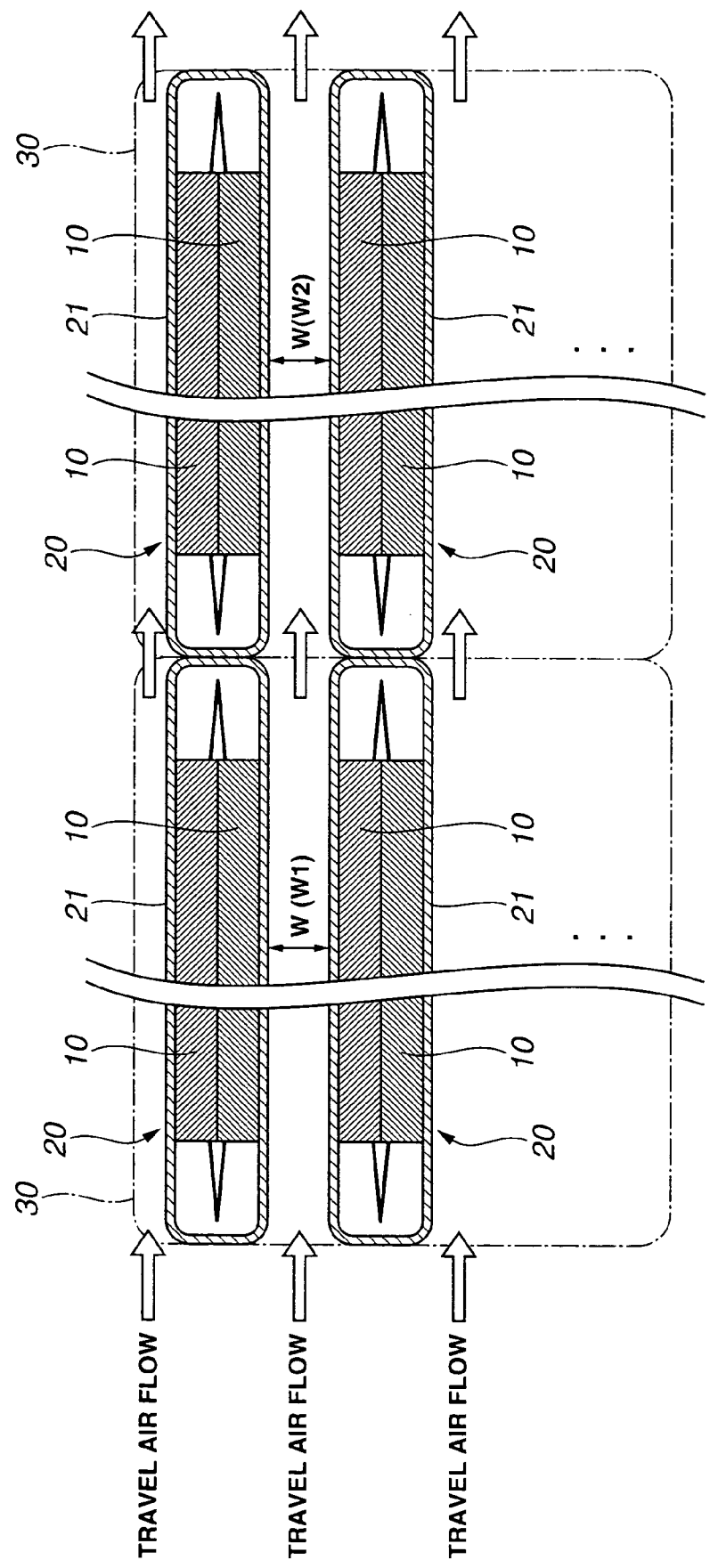
FIG. 7 is a vertical sectional view similar to FIG. 4 but showing a state where two batteries are connected to each other to form a single body, in the embodiment of the battery cooling system according to the present invention.

Hereinafter, battery cooling system 40 for cooling the above battery 30 will be discussed with reference to FIGS. 5 to 7. FIG. 5 is a schematic side view of a vehicle on which the embodiment of the battery cooling system is mounted; FIG. 6 is an enlarged view of a part VI in FIG. 5, showing the embodiment of the battery cooling system; and FIG. 7 is a vertical sectional view similar to FIG. 4 but showing a state where two batteries are connected to each other to form a single body, in the embodiment of the battery cooling system.

The above battery 30 is used as a power source for vehicle 1 such as an electric vehicle (EV), a hybrid electric vehicle (HEV), a fuel cell powered vehicle (FCV) or the like as shown in FIG. 5. Battery cooling system 40 according to this embodiment of the present invention makes it possible to cool battery 30 using travel air flow as a cooling medium which travel air flow is generated under running or traveling of vehicle 1. This battery cooling system includes an accommodating section 41 for accommodating two batteries 30, and a baffle 42 for introducing or guiding travel air flow into accommodating section 41, the babble 42 serving as an introduction device for travel air flow.

Accommodating section 41 of battery cooling system 40 is formed by denting a floor panel of vehicle 1 toward a passenger compartment (not identified). Accommodating section 41 has a such a size as to accommodate two batteries 30 which are arranged side by side in a traveling direction of vehicle 1. Two batteries 30 are accommodated within accommodating section 41 in such a manner that the bottom surface of batteries 30 are positioned at a relatively higher level than the level of bottom surface 1a of a part of vehicle 1 which part is located around accommodating section 41. It will be understood that two batteries 30 may be accommodated within accommodating section 41 in such a manner that the bottom surface of batteries 30 are positioned at the substantially same level or height as the level of bottom surface 1a of the part of vehicle which part is located around accommodating section 41.

Thus, by accommodating batteries 30 within accommodating section 41 in such a manner that the bottom surface of batteries 30 are positioned at the relatively higher level that or the substantially same level as the level of bottom surface 1a of the part of vehicle 1 which part is located around accommodating section 41, air flow resistance of batteries 30 during traveling or running of vehicle 1 can be suppressed, while the batteries 30 can be suitably protected from being damaged, for example, even in case that bottom surface 1a of vehicle 1 is brought into contact with ground surface. Additionally, accommodating batteries 30 under the floor of vehicle 1 makes it possible to effectively use the space of the passenger compartment.

Each battery 30 is accommodated within accommodating section 41 in such a posture that the major surface of each thin cell 10 extends in a direction substantially parallel with the traveling direction of vehicle 1, i.e., in such a posture that each thin cell 10 laterally extends. Accordingly, the battery 30 can take in travel air flow from a direction indicated by a thick arrow in FIG. 3. Here, as discussed above, the clearance W having a certain distance is formed between adjacent sub-assemblies 20 of battery 30, and therefore travel air flow taken in accommodating section 41 can enter a position between adjacent sub-assemblies 20 as shown in FIG. 4 thereby effectively cooling each thin cells 10.

Additionally, regarding this accommodating section 41, upstream side wall surface 41a defining accommodating section 41 is formed inclined in such a manner as to become gradually higher in level in a direction of from the upstream side to the downstream side of travel air flow, as shown in FIG. 6. The upstream side wall surface 41a is located upstream of batteries 30 with respect to travel air flow. The inclination angle of upstream side wall surface 41a is indicated by $\alpha$ in FIG. 6. As apparent from Table 1 whose data are obtained by experiments, travel air flow can be effectively taken in when the inclination angle $\alpha$ of upstream side wall surface 41a is within a range of from about 30° to about 45°. Travel air flow can the most effectively taken in when the inclination angle $\alpha$ is about 45°. In Table 1, "travel air flow taken in" means the intensity of travel air flow taken in the clearance W formed in the battery 30, and "take-in rate" means a rate (percentage) of an amount of travel air flow taken in the battery 30 relative to an amount of travel air flow introduced into the accommodating section 41. The data in Table 1 are obtained under an experimental condition where the intensity of travel air flow itself generated during traveling or running of vehicle 1 is about 11.5 m/s.

TABLE 1

| Inclination angle $\alpha$ (°) | Travel air flow taken in (m/s) | Taking-in rate (%) |
| --- | --- | --- |
| 22 | 3.25 | 28.3 |
| 30 | 3.5 | 30.4 |
| 45 | 4.1 | 35.7 |
| 75 | 3.1 | 27.0 |

As shown in FIG. 6, battery cooling system 40 includes a baffle 42 which is a baffle plate having an upstream side inclined surface 42a which extends upwardly in the direction of from the upstream side to the downstream side of travel air flow (i.e., in the direction of from the front side to the rear side in traveling direction of the vehicle) so as to form an acute angle between it and an imaginary horizontal plane or the extension of bottom surface 1a of the part of vehicle 1 which part is located around accommodating section 41. Baffle 42 installed or fixed to the floor panel or the like of vehicle 1 so as to be located upstream of battery 30 with respect to the travel air flow (i.e., at the front side relative to battery 30 in the vehicle traveling direction) within the accommodating section 41. By virtue of upstream side inclined surface 42a of this baffle 42, it is made possible to effectively take into accommodating section 41 travel air flow generated with running of vehicle 1 and flowing under the floor of vehicle 1.

In order to effectively take travel air flow into the accommodating section 41, a method for compulsorily taking in travel air flow by using a fan or the like will be assumed; however, according to battery cooling system 40 of this embodiment, the taking-in rate of travel air flow is effectively taken in by using baffle 42, and therefore it is made possible to achieve simplification of the battery cooling system.

It will be understood that this baffle 32 may be installed to be located below or above bottom surface 1a of the part of vehicle 1 which part is located around accommodating section 41. In case that baffle 32 is installed to be located below bottom surface 1a, it is made possible to take in more travel air flow; however, baffle 32 cannot be suitably protected from its breakage, for example, when bottom surface 1a of vehicle 1 is brought into sliding contact with ground surface. On the contrary, in case that baffle 32 is installed above the bottom surface, baffle 32 can be suitably protected; however, the taking-in rate of travel air flow lowers.

Furthermore, as shown in FIG. 7, in battery cooling system 40 according to this embodiment, two batteries 30, 30 are located in contact with each other as a single body in such a manner that each clearance W (W1) formed in battery 30 at the upstream side (with respect to the flow direction of travel air flow) is in direct communication with the clearance W (W2) formed in battery 30 at the downstream side. In other words, the clearances W1, W2 are formed aligned with each other in the flow direction of travel air flow. With this, travel air flow flowing through the upstream side battery 30 can be effectively flown into the downstream side battery 30 without emission of travel air flow to the outside.

Hereinafter, effects of the above embodiment of battery cooling system 40 will be discussed upon comparison with similar battery cooling systems with reference to FIGS. 8A to 8E which illustrate a variety of battery cooling systems in which a battery is accommodated under the floor of a vehicle. FIGS. 8A to 8E are schematic sectional views of the battery cooling systems, in which FIG. 8A shows a type 0 battery cooling system in which batteries 30 are amounted at bottom surface (or bottom surface of a floor panel) of a vehicle without forming accommodating section 41; FIG. 8B shows a type 1 battery cooling system in which batteries 30 are only accommodated within accommodating section 30, and a downstream (in the flow direction of travel air flow) side wall surface is generally vertical through not shown; FIG. 8C shows a type 2 battery cooling system similar to the type 1 battery cooling system with the exception that baffle 42 is added to the type 1 battery cooling system; FIG. 8D is a type 3 battery cooling system which is similar to the type 2 battery cooling system with the exception that a downstream side (in the flow direction of travel air flow) wall surface of accommodating section 41 is inclined to lower in the flow direction of travel air flow; and FIG. 8E shows a type 4 battery cooling system similar to the type 2 battery cooling system with the exception that two batteries 30 are brought into contact with each other as a single body.

As indicated in Table 2, travel air flow hardly flows into accommodating section 1 in case that only depression-shaped accommodating section 41 is formed at the floor panel as in the type 2 battery cooling system shown in FIG. 8B. However, the taking-in rate of travel air flow can be improved by providing baffle 42 as the types 2 to 4 battery cooling systems shown respectively in FIGS. 8C to 8E. It will be understood that presence and absence of the inclination of the downstream side wall surface hardly affect the taking-in rate of travel air flow as will be apparent from the data of the types 2 and 3 battery cooling systems indicated in Table 2.

Additionally, by bringing the upstream and downstream side batteries 30, 30 into contact with each other as a single body as the type 4 battery cooling system shown in FIG. 8E and like the embodiment of the present invention, the taking-in rate of travel air flow is largely improved, and therefore the battery cooling system can be brought close to an ideal condition (like the type 0 battery cooling system shown in FIG. 8A) in which travel air flow directly strikes the battery without forming accommodating section 41. In this connection, the type 0 battery cooling system without accommodating section 41 cannot not protect the battery from its breakage at all, for example, when bottom surface 1a of vehicle 1 is in sliding contact with ground surface, and therefore it cannot be employed. In Table 2, "travel air flow taken in" means the intensity of travel air flow taken in the clearance W (W1, W2) formed in the battery 30, and "take-in rate" means a rate (percentage) of an amount of travel air flow taken in the battery 30 relative to an amount of travel air flow introduced into the accommodating section 41. The data in Table 2 are obtained under an experimental condition where the intensity of travel air flow itself generated during traveling or running of vehicle 1 is about 11.5 m/s.

TABLE 2

| Type of battery cooling system | Travel air flow taken in (m/s) | Taking-in rate (%) |
|---|---|---|
| Type 0 | 1.5 | 30.0 |
| Type 1 | 0.07 | 1.4 |
| Type 2 | 0.34 | 6.8 |
| Type 3 | 0.33 | 6.6 |
| Type 4 (embodiment of the invention) | 1.1 | 22.0 |

Figure 9:
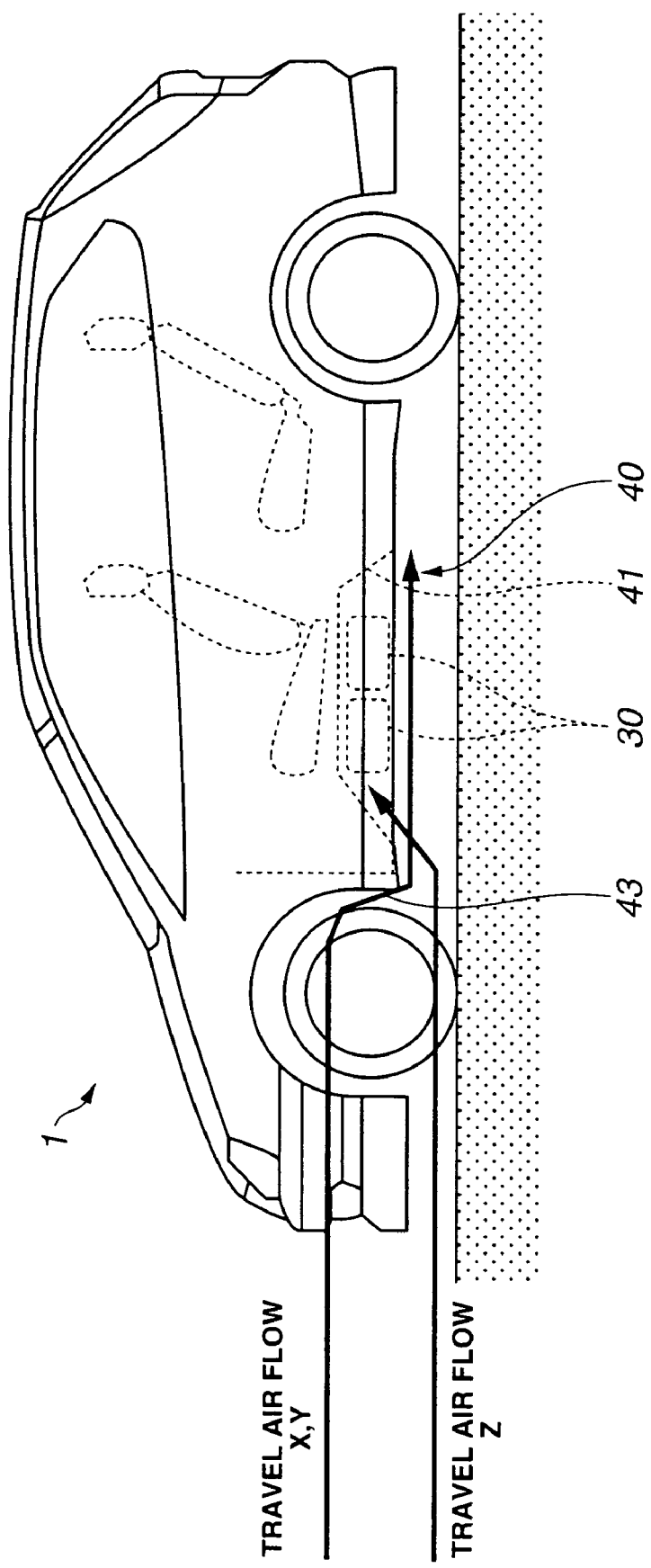
FIG. 9 is a schematic side view of a vehicle on which another embodiment of the battery cooling system according to the present invention is mounted.
Figure 12A:
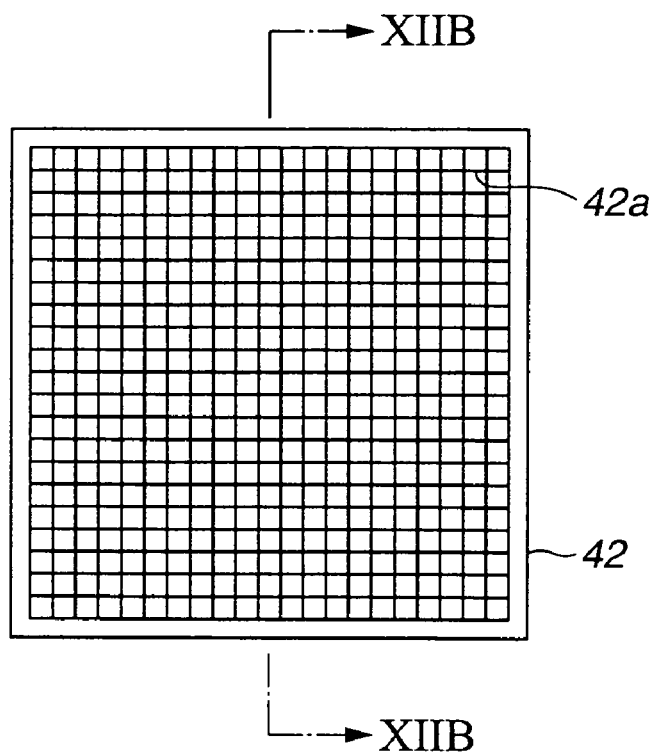
FIG. 12A is a front view of an example of a heat absorbing member used in the battery cooling system of FIG. 9.
Figure 12B:
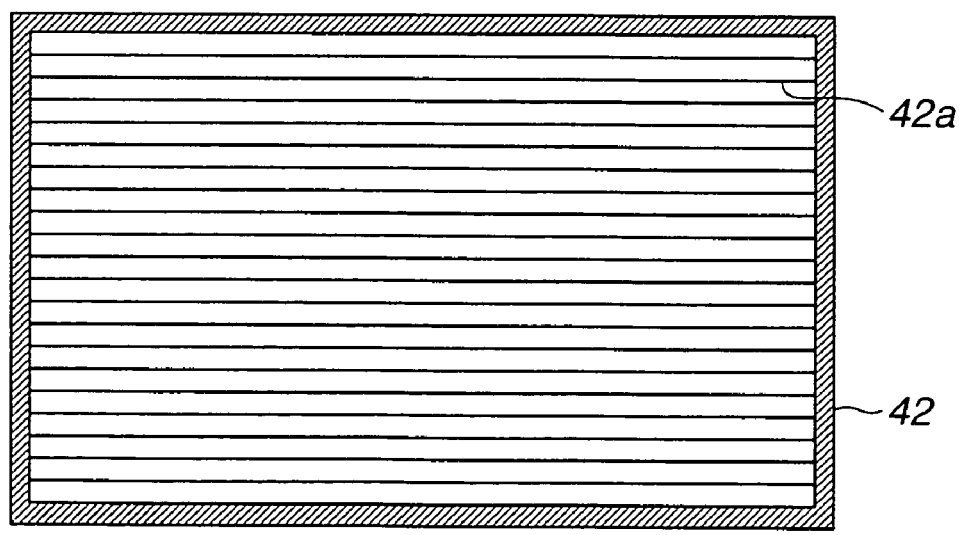
FIG. 12B is a sectional view taken in the direction of arrows substantially along the line XIIB-XIIB of FIG. 12A.
Figure 13:
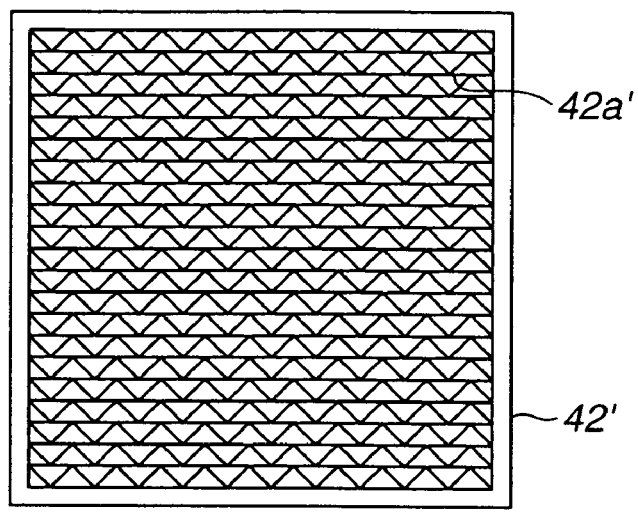
FIG. 13 is a front view of another example of the heat absorbing member used in the battery cooling system of FIG. 9.
Figure 14:
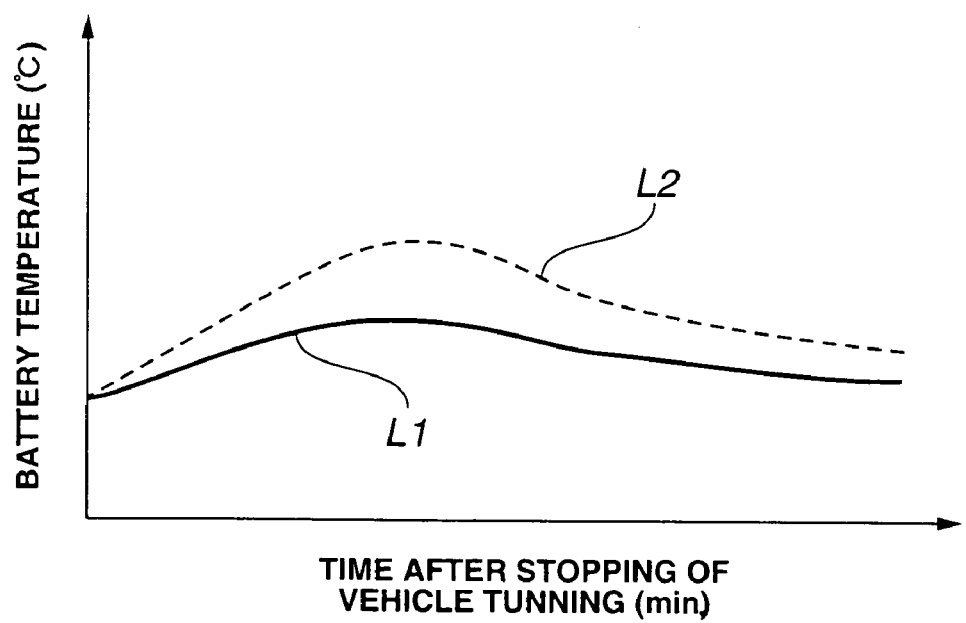
FIG. 14 is a graph showing a temperature rising suppressing effect according to the battery cooling system according to the present invention.

FIGS. 9 to 15 illustrate another embodiment of the battery cooling system according to the present invention, similar to the above embodiment discussed with reference to FIGS. 1 to 8E. In this embodiment, battery 30 is used as a power source for traveling or running of vehicle 1 which is a hybrid electric vehicle (HEV) equipped with engine 2 and radiator 3 as a heat source. In battery cooling system 40 according to this embodiment of the present invention, battery 30 can be cooled by using travel air flow as a cooling medium, generated with traveling or running of vehicle 1. FIG. 9 is a schematic side view of a vehicle on which this embodiment of the battery cooling system is mounted; FIG. 10A is a schematic perspective view of the first embodiment of the battery cooling system of FIG. 9, showing a condition established during traveling of the vehicle; FIG. 10B is a schematic sectional view of the battery cooling system of FIG. 9, showing the condition established during traveling of the vehicle; FIG. 10C is a schematic top plan view of the battery cooling system of FIG. 9, showing the condition established during traveling of the vehicle; FIG. 11 is a schematic perspective view of the battery cooling system of FIG. 9, showing a condition established during stopping of traveling of the vehicle; FIG. 12A is a front view of an example of a heat absorbing member or device used in the battery cooling system of FIG. 9; FIG. 12B is a sectional view taken in the direction of arrows substantially along the line XIIB-XIIB of FIG. 12A; FIG. 13 is a front view of another example of the heat absorbing member or device used in the battery cooling system of FIG. 9; and FIG. 14 is a graph showing a temperature rising suppressing effect according to the battery cooling system.

As shown in FIGS. 9, 10A to 10C and 11, this battery cooling system 40 includes accommodating section 41 for accommodating two batteries 30. Heat absorbing member or device 42 is provided to absorb heat (applied from engine 2 and radiator 3) from air flowing into accommodating section 41 through a space under the floor of vehicle 1. A flow passage 43 is formed to introduce air passing through the circumference of engine 2 and radiator 3 to the lateral sides of vehicle 1 so as to release air.

Also in this embodiment, accommodating section 41 of battery cooling system 40 is formed by denting a floor panel of vehicle 1 toward a passenger compartment. Accommodating section 41 has a such a size as to accommodate two batteries 30 which are arranged side by side in a traveling direction of vehicle 1. Two batteries 30 are accommodated within accommodating section 41 in such a manner that the bottom surface of batteries 30 are positioned at a relatively higher level than the level of bottom surface 1a of a part of vehicle 1 which part is located around accommodating section 41. It will be understood that two batteries 30 may be accommodated within accommodating section 41 in such a manner that the bottom surface of batteries 30 are positioned at the substantially same level or height as the level of bottom surface 1a of a part of vehicle which part is located around accommodating section 41.

Thus, by accommodating batteries 30 within accommodating section 41 in such a manner that the bottom surface of batteries 30 are located at the relatively higher level that or the substantially same level as the level of bottom surface 1a of a part of vehicle 1 which part is located around accommodating section 41, air flow resistance of batteries 30 during traveling or running of vehicle 1 can be suppressed, while the batteries 30 can be suitably protected from being damaged, for example, even in case that bottom surface 1a of vehicle 1 is brought into contact with ground surface. Additionally, accommodating batteries 30 under the floor of vehicle 1 makes it possible to effectively use the space of the passenger compartment.

Each battery 30 is accommodated within accommodating section 41 in such a posture that the major surface of each thin cell 10 extends in a direction substantially parallel with the traveling direction of vehicle 1, i.e., in such a posture that each thin cell 10 laterally extends. Accordingly, the battery 30 can take in travel air flow from a direction indicated by a thick arrow in FIG. 3. Here, as discussed above, the clearance W having a certain distance is formed between adjacent sub-assemblies 20 of battery 30, and therefore travel air flow taken in accommodating section 41 can enter a position between adjacent sub-assemblies 20 as shown in FIG. 4 thereby effectively cooling each thin cells 10.

Additionally, regarding this accommodating section 41, upstream side wall surface 41a defining accommodating section 41 is formed inclined in such a manner as to become generally higher in level in a direction of from the upstream side to the downstream side of travel air flow, as shown in FIG. 10B. The upstream side wall surface 41a is located upstream of batteries 30 with respect to travel air flow. The inclination angle of upstream side wall surface 41a is indicated by α in FIG. 10B. It is confirmed that travel air flow can be effectively taken in when the inclination angle α of upstream side wall surface 41a is within a range of from about 30° to about 45°. Travel air flow can be most effectively taken in when the inclination angle α is about 45°.

As shown in FIGS. 12A and 12B, heat absorbing member or device 42 of battery cooling system 30 is a honeycomb or lattice-like structure formed with many through-openings or air flow passages 42a which axially pierce from an upstream end to an downstream end of the heat absorbing member 42. The heat absorbing member 42 is formed of a material which is high in thermal conductivity, for example, a ceramic material or a metallic material such as copper or aluminum, or the like material. The honeycomb structure as heat absorbing member 42 is not limited to the above-mentioned lattice-like structure as far as the honeycomb structure can have a large surface area contacting with fluid (air) flowing though the through-openings 42a, and therefore the honeycomb structure may be one 42' which is constituted by combination of corrugated sheets and flat sheets thereby forming through-openings or passages 42a' defined by the contacted corrugated sheet and flat sheet.

This heat absorbing member 42 is disposed on a front side of or in front of battery 30 in the vehicle running direction (in which vehicle 1 travels or runs) as shown in FIGS. 10B and 11. Heat absorbing member 42 is installed in such a manner that the axial direction of many through-openings 42 is parallel with the upstream side wall surface 41a, i.e., through-openings 42 extend along the inclination of the upstream side wall surface 41a.

As illustrated in FIG. 10B and 11, during stopping of traveling or running of vehicle 1, hot air flow different from travel air flow during traveling or running of the vehicle is generated. By disposing heat adsorbing member 42 on the front side of battery 30 in the vehicle running direction as discussed above, it can be possible to absorb heat applied from engine 2 and radiator 3, from air flowing through the space under the floor of vehicle 1 into the accommodating section 41 during stopping of running of vehicle 1. By this, as shown in FIG. 14, it can be possible to suppress a temperature rise of battery 30 during stopping of running of vehicle 1 as indicated by a line L1 in FIG. 14, as compared with a case that the battery cooling system which is provided with no heat adsorbing device as indicated by a line L2 in FIG. 14.

In battery cooling system 40 according to this embodiment, the heat absorbing member is the honeycomb structure, and therefore air heated by engine 12 and radiator 3 becomes difficult to reach battery 30 under the effect of air flow resistance of the honeycomb structure during stopping of running of vehicle 1.

Furthermore, in battery cooling system 40 according to this embodiment, the through-openings 42a of heat absorbing member 42 is inclined along upstream side wall surface 41a of accommodating section 41, and therefore it is possible to effectively take in travel air flow Z into accommodating section 41 during traveling or running of vehicle 1 as shown in FIG. 10B. It will be understood that travel air flow Z in FIGS. 6A to 6C is a travel air flow which is flown into accommodating section 41 through the space under the floor of vehicle 1 during traveling or running of vehicle 1 without being heated by engine 2 and radiator 3.

Figure 10C:
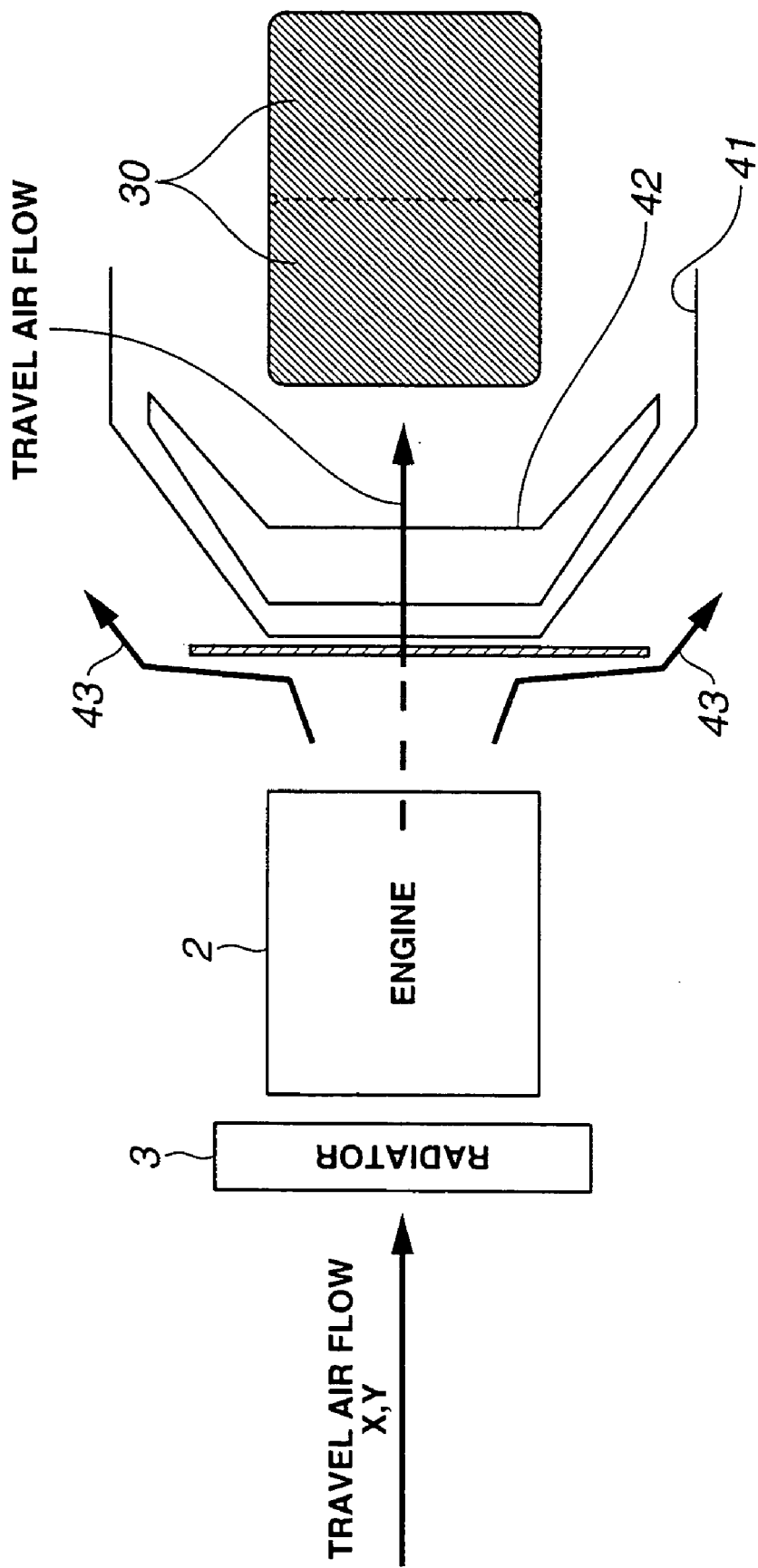
FIG. 10C is a schematic top plan view of the battery cooling system of FIG. 9, showing the condition established during traveling of the vehicle.

Flow passage 43 for releasing air, of battery cooling system 40 is arranged such that travel air flows X, Y passing through the circumference of engine 2 and radiator 3 are introduced into the left and right sides by partition panel 1b so as to release the travel air flows to the left and right side spaces under the floor of vehicle 1, as illustrated in FIGS. 10A to 10C. In FIGS. 10A to 10C, the travel air flow X is a travel air flow which passes through radiator 3 and strikes against engine 2, and thereafter is introduced to the left and right sides by partition panel 1b to be released to the space under the floor of vehicle 1, during traveling or running of vehicle 1. The travel air flow Y is a travel air flow which passes through the radiator but does not strike against engine 2, and is introduced to the left and right sides after joining together with the travel air flow X so as to be released to the space under the floor of vehicle 1, during traveling or running of vehicle 1.

With the thus arranged flow passage 43 for air-releasing, the travel air flows X, Y heated by engine 2 and radiator 3 can be prevented from entering accommodating section 41 during traveling or running of vehicle 1. Additionally, also under idling condition where the vehicle running is stopped, air heated by engine 2 and radiator 3 can be released through air-releasing flow passage 43 under the action of a radiator fan (not shown), and therefore it is possible to suppress a temperature rise of battery 30 with heat of engine 2 and radiator 3.

Furthermore, in battery cooling system 40 according to this embodiment, two batteries 30, 30 are located in contact with each other as a single body in such a manner that each clearance W (W1) formed in battery 30 at the upstream side (with respect to the flow direction of travel air flow) is in direct communication with the clearance W (W2) formed in battery 30 at the downstream side, as shown in FIG. 7. In other words, the clearances W1, W2 are formed aligned with each other in the flow direction of travel air flow. With this, travel air flow flowing through the upstream side battery 30 can be effectively flown into the downstream side battery 30 without emission of travel air flow to the outside.

While preferred embodiments of the invention have been described, such descriptions are for illustrative purposes only and not for liming the invention, and it is to be understood that all modifications will occur to those skilled in the art without departing from the spirit of the invention, covering all equivalents. For example, the number and connecting manner of the thin cells constituting the battery, and the number and connecting manner of the batteries mounted on the vehicle are not limited to those in the above-discussed embodiment, so that the numbers and the connecting manners may be suitably set in accordance with desired voltages and capacities.

The entire contents of Japanese Patent Application Nos. 2004-274016, filed Sep. 21, 2004, and 2004-274017, filed Sep. 21, 2004 are incorporated herein by reference.

What is claimed is:

1. A battery cooling system comprising:
   a battery;
   a depression-shaped battery accommodating section formed at a bottom surface of a floor panel of a vehicle and dented to side of a passenger compartment so as to accommodate therein the battery; and
   an introduction device disposed in front of the battery in a vehicle traveling direction, to introduce travel air flow into the battery accommodating section,
   wherein the battery is accommodated within the battery accommodating section in a condition where a bottom surface of the battery is located at a level above or at a substantially same level as a level of a bottom surface of the vehicle which bottom surface is around the accommodating section,
   wherein the battery includes a plurality of thin cells which are electrically connected with each other, and disposed in a posture that a major surface of each thin cell extends substantially parallelly with the vehicle traveling direction, and wherein the introduction device includes a baffle for adjusting a flow direction of travel air flow to introduce travel air flow into the battery accommodating section.

2. A battery cooling system as claimed in claim 1, wherein the thin cells are piled up one upon another, wherein a clearance is formed between at least one major surface of one of thin cells and major surface of at least one of the thin cells.

3. A battery cooling system as claimed in claim 2, wherein the battery includes at least first and second batteries which are connected to each other as a single body, wherein the clearance in the first battery and the clearance in the second battery are aligned with each other to be in direct communication with each other.

4. A battery cooling system comprising:
a battery;
a depression-shaped battery accommodating section formed at a bottom surface of a floor panel of a vehicle and dented to side of a passenger compartment so as to accommodate therein the battery; and
an introduction device disposed in front of the battery in a vehicle traveling direction, to introduce travel air flow into the battery accommodating section,
wherein the battery is accommodated within the battery accommodating section in a condition where a bottom surface of the battery is located at a level above or at a substantially same level as a level of a bottom surface of the vehicle which bottom surface is around the accommodating section,
wherein the battery includes a plurality of thin cells which are electrically connected with each other, and disposed in a posture that a major surface of each thin cell extends substantially parallelly with the vehicle traveling direction, and
wherein the introduction device includes a heat absorbing device for absorbing heat from a fluid flown in the heat absorbing device which fluid has been supplied with heat from a heat source of the vehicle.

5. A battery cooling system as claimed in claim 4, further comprising a section defining a flow passage for introducing fluid passing through the heat source and circumference of the heat source to a side direction of the vehicle so as to release the fluid.

6. A battery cooling system as claimed in claim 4, wherein the battery accommodating section has an upstream side wall surface which is inclined to become higher in level in a direction of from an upstream side to a downstream side of travel air flow, wherein the heat adsorbing device including a section defining a plurality of through-openings which pierce from an upstream end to an downstream end of the heat adsorbing device, wherein the heat adsorbing device is installed to the upstream side wall surface in a manner that the through-openings extend along the upstream side wall surface.

7. A battery cooling system as claimed in claim 4, wherein the thin cells are piled up one upon another, wherein a clearance is formed between at least one major surface of one of thin cells and major surface of at least one of the thin cells.

8. A battery cooling system as claimed in claim 4, wherein the battery includes at least first and second batteries which are connected to each other as a single body, wherein the clearance in the first battery and the clearance in the second battery are aligned with each other to be in direct communication with each other.

* * * * *